United States Patent Office 3,285,097
Patented Nov. 15, 1966

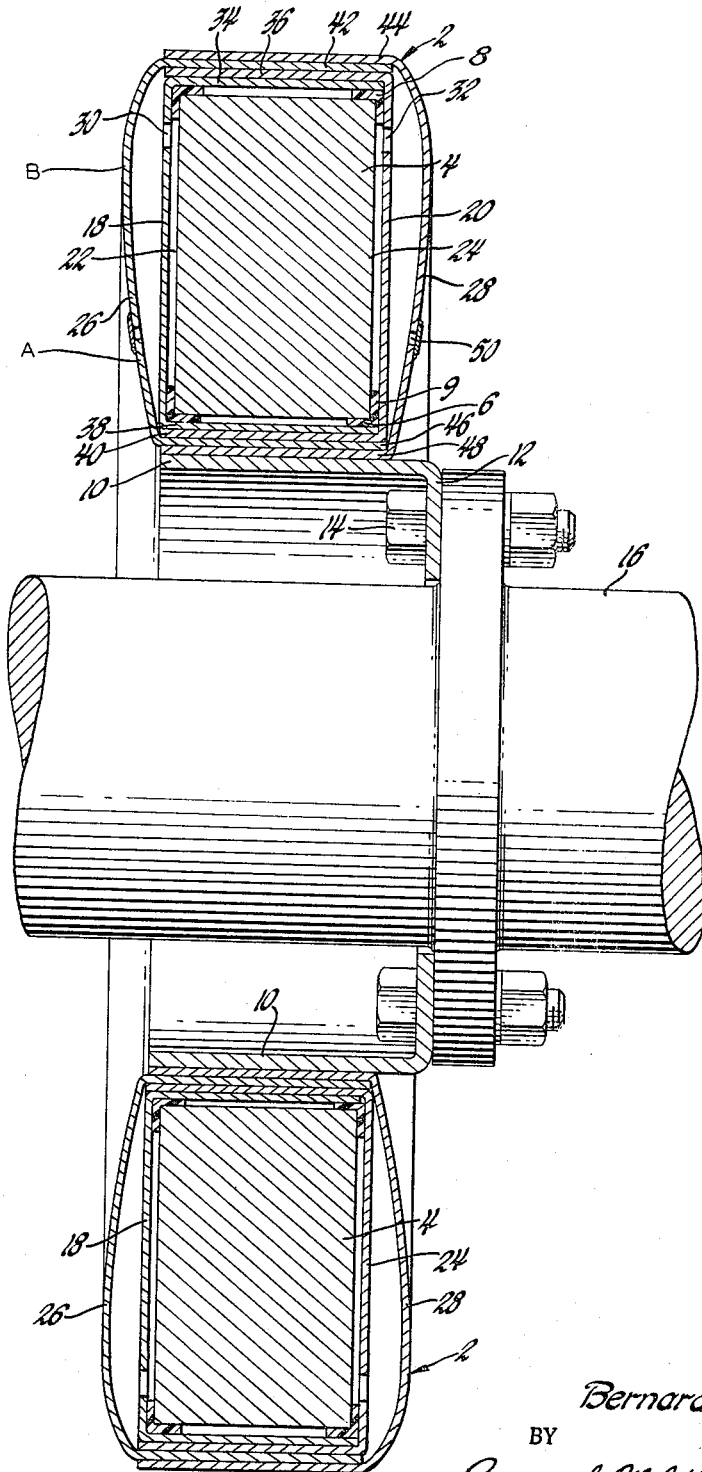

3,285,097
TORSIONAL VIBRATION DAMPER
Bernard E. O'Connor, 8904 Rindge,
Playa Del Rey, Calif.
Filed July 29, 1964, Ser. No. 385,951
12 Claims. (Cl. 74—574)

This invention relates to torsional vibration dampers and more particularly to dampers such as are used on reciprocating engine chankshafts.

One of the most commonly used and efficient types of dampers used to damp the torsional vibration in reciprocating engines is the so-called viscous damper. Such a damper consists, in general, of an annular casing which is concentrically secured to the crankshaft for rotation therewith, an annular inertia member positioned concentrically within the casing and rotatable with respect thereto, and a fluid, such as silicone oil, within the casing and filling the space between the casing and the inertia member. The spacing between the inertia member and the casing is predetermined as is the mass of the inertia member to provide the required damping characteristics for the particular type of engine for which the damper is to be used. In operation, the casing and the fluid rotate with the crankshaft and in the absence of torsional vibration the inertia member is caused to rotate at the same speed by reason of the coupling provided by the relative thin film of fluid between the casing and the inertia member; however, with torsional vibration, the inertia member lags upon the momentary accelerations of the casing, the viscous fluid coupling absorbing and dissipating the vibratory energy. From this it will be manifest that the annular casing has two functions. First, it functions as a casing to contain the fluid. Secondly, the casing functions as one of the two members of the fluid coupling rotatable with respect to each other, the side walls of the casing being in predetermined closely spaced relationship to the side walls of the inertia member with the viscous fluid therebetween. Since the spacing between the two relatively movable members is critical and must be relatively uniform, it is desirable and common practice to form both the casing and the inertia member with flat side walls which serve as the closely spaced surfaces for the fluid coupling. However, such structure while excellent from the standpoint of the function of the casing as one of the relatively movable members of the fluid coupling is disadvantageous from the standpoint of its function as a container for the fluid. The disadvantage stems from the fact that considerable fluid pressure is developed within the casing due to the centrifugal force on the viscous fluid from the high speed of rotation thereof. It is of course essential to the maintenance of proper spacing between relatively movable members that the casing side walls not be distorted, as by bulging outwardly, from the internal fluid pressure; hence the casing must be constructed of relatively heavy gauge metal to afford the strength necessary to preclude any such distortion. This adds considerable weight to the casing and the extra weight is costly in manufacture and has a negative effect on damper efficiency. Actually, the ideal casing would be one which would have minimum weight, would be simple and therefore inexpensive to manufacture and which would adequately serve both functions as described. It is the principal object of the present invention to provide a viscous torsional vibration damper having structure which meets these requirements.

Briefly, this is accomplished in accordance with the preferred embodiment of the invention by a viscous damper wherein the fluid casing has inner rim and outer peripheral wall portions, inner axially spaced annular walls which are in predetermined closely spaced relationship with the side walls of the annular inertia member and outer axially spaced annular side walls which function to contain the fluid within the casing and are shaped to provide an optimum strength-to-weight ratio. Openings are provided in the inner walls to allow free communication and equalization of pressure between the fluid within the space between the inner walls and the inertia mass and the fluid between the inner and outer side walls. To provide the optimum strength-to-weight ratio, the outer side walls are bulged outwardly such that they have an arcuate cross section with a developed curvature, the curvature being such that the cross sectional width of the casing is greatest at a point closer to the outer peripheral wall portion of the casing than to the inner rim wall portion thereof. To provide ease of manufacture and optimum uniformity of spacing between the inertia member and the inner walls, the latter and the side walls of the inertia member are flat. Further, in accordance with the invention such double walled casing is manufactured simply and at low cost by constructing it of two sets of sheet metal stampings which are nested together as hereinafter described in detail, one set providing the inner side walls and one other set providing the outer side walls. Such construction provides a casing having an outer or peripheral cylindrical wall of greater thickness than that of the fluid retaining side walls thereby providing the outer wall with adequate strength to withstand the considerable fluid pressures exerted thereagainst during rotation.

In effect then what has been done in accordance with the present invention is to separate, so to speak, the two functions of the vibration damper casing, one set of side walls being provided to serve the one function and the second set of side walls being provided to fulfill the second function. This enables each set of side walls to be shaped and constructed for optimum performance of only one function, the overall result being a considerable reduction in weight and cost of manufacture and with an improvement in performance.

The above and other objects, features and advantages of the invention will appear more clearly from the following detailed description of a preferred embodiment thereof made with reference to the drawing which shows a cross-sectional view of a torsional vibration damper constructed in accordance with the invention.

Referring now to the drawing, the vibration damper comprises an annular metal casing 2, described in detail hereinafter, an annular metal inertia member 4 supported concentrically within the casing by inner and outer pairs of ring-shaped bearings 6 and 8 respectively whereby the inertia member is slidably rotatable within and with respect to the casing, and a hub 10 secured as by welding or brazing to the inner cylindrical wall of the casing 2. The hub 10 has a radially inwardly extending flange portion 12 with a plurality of circumferentially arranged openings which receive bolts 14 for securing the damper to a flange provided on the crankshaft 16. Hence, the damper is fixedly secured in concentric relationship to the crankshaft for rotation therewith.

The casing is filled with a suitable liquid, preferably silicone oil which is well known in the viscous damper art.

In accordance with the invention the casing 2 includes axially spaced annular flat walls 18 and 20 to either side of and in predetermined spaced relationship with the flat annular side walls 22 and 24, respectively of the inertia member 4. These inner flat walls are enclosed within the outer casing walls 26 and 28, each of the inner walls being formed with a plurality of circumferentially arranged perforations, as shown at 30 and 32 to provide an opening for free communication of the liquid to both sides of the inner walls and hence equalization of fluid pressure throughout the casing.

For simplicity of manufacture, such structure is formed by an inner pair of annular metal stampings of U shaped cross section having outer cylindrical walls 34 and 36 and inner cylindrical walls 38 and 40 which depend from the side walls 18 and 20, and which telescope together to form an inner hollow annulus for reception of the inertia member between the spaced flat side walls 18 and 20. A second pair of similar metal stampings having outer cylindrical side walls 42 and 44 and inner cylindrical side walls 46 and 48 depending from side walls 26 and 28, likewise telescope together to form a hollow annulus surrounding that formed by the inner pair of stampings. The inner cylindrical walls of the stampings are bonded together as by welding or brazing to form the inner or rim wall portion of the casing and the outer cylindrical walls are likewise bonded together to form the outer peripheral wall portion of the casing. The bonding forms a fluid tight seal and a suitable opening is provided as shown at 50 to fill the casing with viscous fluid. After the casing is filled with fluid the opening can be welded shut.

The pairs of ring-shaped bearings 6 and 8 are preferably made of Teflon (polytetrafluoroethylene), ideally Teflon cloth bonded to a phenolic resin matrix as shown in United States Reissue Patent 24,765. The phenolic resin which serves as a backing for the Teflon cloth can be bonded to the casing. It will be understood of course that other bearing material well known in the art may be used if desired. The bearings abut and can be bonded to the walls of the casing and are of L-shaped section having radially outwardly extending flanges as shown at 9, serving to space the inertia member 4 from the casing side wall. The flanges 9 are of predetermined thickness to provide the desired spacing between the inner walls 18 and 20 and the inertia member. Since the weight of the inertia member is supported on the bottom portions of the bearings which abut the casing rim wall, there is substantially no wear on the flanges 9 and hence the proper spacing is maintained for the full life of the damper.

The structure shown provides the casing with a rigid high strength cylindrical outer wall having a considerably greater thickness than that of the fluid-retaining side walls 26 and 28. Hence, the cylindrical peripheral wall with its high rigidity and strength assures against radially inward collapse of the casing from any forces exerted on the side walls.

It should be noted that with the structure as shown and as thus far described there can be no distortion of the inner walls 18 and 20 by reason of fluid pressure developed within the casing since the fluid is on both sides of the side walls with free fluid communication through the openings provided by perforations 30 and 32. Hence, even if the outer side walls 26 and 28 were of a shape which could distort relatively easily and as the result of which there were distortion of these outer sidewalls during operation, such would in no way effect the spacing between the inertia member 4 and the casing since the inner walls 18 and 20 function to provide such spacing. Further, in the preferred embodiment shown, the shape of the outer side walls is such as to provide optimum assurance against any distortion thereof from fluid pressure developed within the casing due to centrifugal forces from the high speed rotation of the casing. That is, the outer side walls 26 and 28 are bowed outwardly with an arcuate cross-sectional curvature, the same as that to which they would tend to be shaped or stretched by internal fluid pressure during rotation if they were initially made flat. It should be noted again in this regard that both the inner rim and the outer peripheral cylindrical wall portions of the casing are relatively thick and therefore sufficiently rigid to assure against radial collapse or any other distortion thereto. Hence the forces of internal fluid pressure exerted on the side walls 26 and 28 put them in tension between the cylindrical walls. Since the internal fluid pressure exerted on the side walls is greater toward the periphery of the casing than adjacent the hub, the walls, if initially made say flat, would tend to take the shape shown, i.e. an outwardly bowed shape with a cross-sectional arcuate curvature having a larger radius of curvature at a point adjacent the hub such as indicated at A than at a point a greater distance from the hub such as indicated at B. Hence, the arcuate cross-sectional shape of the side walls is such that the casing has a progressively increasing width between outer side walls with its greater width at a point B closer to the outer peripheral wall than to the inner rim wall. With the side walls so constructed the possibility of any distortion is substantially eliminated; during operation all portions of the side walls are under substantially the same amount of tension.

From the above, it will be seen that, if desired, the inner side walls 18 and 20 can be eliminated and the inertia member 4 constructed with the side walls having the same bowed shape as but spaced a predetermined distance from the bowed side walls 26 and 28 of the casing. In this embodiment the outer side walls function not only to contain the fluid but also as one of the spaced members in the fluid coupling. With the bowed shape and the possibility of side wall distortion thereby being substantially eliminated, there is optimum assurance of constancy of critical spacing between the casing and the inertia member and yet with a very lightweight and inexpensive casing. The disadvantage to this embodiment as compared with the preferred embodiment shown in the drawing is that it is more difficult, in manufacture, to provide a closely controlled predetermined uniform spacing between curved surfaces than between flat surfaces. In the preferred embodiment shown the inner side walls in particular can be made of very thin steel or other metal sheet stock and hence the added expense and weight thereof is slight. Another embodiment wherein the improved casing is used in a function type damper with means therein for varying the frictional contact pressure with rotary speed is shown in my U.S. application 385,952 filed concurrently herewith now Patent No. 3,264,898. Hence, it will be understood that while the invention has been described with reference to particular embodiments thereof, various changes and modifications may be made all within the full and intended scope of the claims which follow.

I claim:
1. A torsional vibration damper comprising an annular casing containing a liquid and having side walls which are bowed outwardly with a substantially smooth continuously curved cross section, and an annular inertia member rotatably supported in concentric relationship within said casing.

2. A torsional vibration damper comprising an annular casing containing a liquid and having side walls which are bowed outwardly with a substantially smooth continuously curved cross section, and an annular inertia member rotatably supported in concentric relationship within said casing, said inertia member being in predetermined spaced relationship to said casing.

3. A torsional vibration damper as set forth in claim 2 wherein the predetermined spaced relationship is between said inertia member and walls in said casing spaced from said side walls.

4. A torsional vibration damper comprising an annular casing containing a liquid, said casing having an inner rim wall portion, an outer peripheral wall portion and outwardly bowed side walls, said side walls having an arcuate cross section with a developed curvature such that the cross sectional width of the casing between the side walls is greater at a point closer to said peripheral wall portion than to said rim wall portion, and an annular inertia mass rotatably supported in concentric relationship within said casing.

5. A torsional vibration damper comprising an annular casing containing a liquid, said casing having an inner rim wall portion, an outer peripheral wall portion and outwardly bowed side walls, said side walls having an arcuate cross section with a developed curvature such that the cross sectional width of the casing between the side walls is greatest at a point closer to said peripheral wall portion than to said rim wall portion, and an annular inertia mass rotatably supported in concentric relationship with said casing, said inertia mass having annular side surfaces in predetermined spaced relationship to said casing.

6. A torsional vibration damper as set forth in claim 5 wherein the predetermined spaced relationship is between the side surfaces of said inertia member and walls in said casing spaced from said side walls.

7. A torsional vibration damper comprising an annular casing containing a liquid and an annular inertia member supported concentrically within said casing for rotation with respect thereto, said casing having outer side walls and inner side walls spaced from said outer side walls, said inner side walls being in predetermined spaced relationship to said inertia member.

8. A torsional vibration damper comprising an annular casing containing a liquid and an annular inertia member supported concentrically within said casing for rotation with respect thereto, said casing having outer side walls, inner side walls spaced from said outer side walls and in predetermined spaced relationship to said inertia member and means for maintaining the liquid pressure on both sides of said inner side walls equal.

9. A torsional vibration damper as set forth in claim 8 wherein said casing comprises an inner pair of annular members each of U shaped cross section which are telescoped together to form a hollow annulus the side walls of which constitute the inner side walls of the casing and an outer pair of annular members each of U shaped cross section which are telescoped together to form a hollow annulus around said first mentioned hollow annulus and the side walls of which constitute the outer side walls of the casing.

10. A torsional vibration damper comprising an annular casing containing a liquid and an annular inertia member with flat sides supported concentrically within said casing for rotation with respect thereto, said casing having a cylindrical peripheral wall, a cylindrical rim wall, outer bowed side walls and inner flat side walls in predetermined spaced relationship to the flat sides of said inertia member, said inner side walls having openings therethrough for maintaining the liquid pressure on both sides of said inner side walls equal.

11. A torsional vibration damper as set forth in claim 10 wherein said bowed side walls have a developed curvature such that the cross sectional width of the casing between the bowed side walls is greatest at a point closer to said peripheral wall than to said rim wall.

12. A torsional vibration damper comprising an annular casing containing a liquid and an annular inertia member supported concentrically within said casing for rotation with respect thereto, said casing having outwardly bowed side walls with a substantially smooth continuously curved cross section such that all portions of said side walls are under equal tension from the pressure of the liquid resulting from centrifugal force during rotation of said damper.

References Cited by the Examiner
UNITED STATES PATENTS
1,719,805   7/1929   Hammond _____ 74—574

FRED C. MATTERN, JR., *Primary Examiner.*

MILTON KAUFMAN, *Examiner.*

W. S. RATLIFF, JR., *Assistant Examiner.*